(12) United States Patent
Szwagrzyk et al.

(10) Patent No.: US 7,773,453 B2
(45) Date of Patent: Aug. 10, 2010

(54) FIFO PEEK ACCESS

(75) Inventors: Jerzy Szwagrzyk, Monument, CO (US); Jeffrey K. Whitt, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 315 days.

(21) Appl. No.: 12/062,780

(22) Filed: Apr. 4, 2008

(65) Prior Publication Data

US 2009/0251986 A1    Oct. 8, 2009

(51) Int. Cl.
*G11C 9/00* (2006.01)

(52) U.S. Cl. ............ 365/230.09; 365/83; 365/189.15; 365/189.17; 365/189.05; 365/189.08; 365/189.12; 365/219; 365/239; 711/109

(58) Field of Classification Search ............ 365/83, 365/189.15, 189.17, 189.05, 189.08, 189.12, 365/219, 230.09, 239, 240; 711/109
See application file for complete search history.

(56) References Cited

U.S. PATENT DOCUMENTS

| 7,287,105 | B1 * | 10/2007 | Owen et al. ............ 710/52 |
| 7,673,072 | B2 * | 3/2010 | Boucher et al. ........ 709/245 |
| 2009/0248919 | A1 * | 10/2009 | Szwagrzyk et al. ...... 710/52 |

* cited by examiner

*Primary Examiner*—Huan Hoang
*Assistant Examiner*—Fernando N Hidalgo
(74) *Attorney, Agent, or Firm*—Christopher P. Whitham; William W. Cochran; Cochran Freund & Young LLC

(57) ABSTRACT

Disclosed is a FIFO peek access device that utilizes a peek signal to access data stored in a FIFO without losing or erasing data. The peek signal is applied to read address logic and prevents the incrementing of the pointers in the peek address logic, so that after a read enable signal is asserted, the same data block can be accessed again on the next read enable signal.

6 Claims, 4 Drawing Sheets

FIFO PEEK ACCESS

BACKGROUND OF THE INVENTION

FIFO memory is a convenient type of memory that allows quick and easy access to data. FIFO memory can be implemented in individual high speed registers or in soft memory, i.e., RAM. However, in the process of reading and writing data, various problems can be encountered, including the loss of data.

SUMMARY OF THE INVENTION

One embodiment of the present invention may comprise a method of reading data from two separate portions of a register without losing data comprising: generating a first read enable signal for accessing data from a first portion of the register; applying the first read enable signal to address logic to generate first address read signals that download the data from the first portion of the register; generating an index signal from the address read signals; applying the index signal to the address logic; applying the peek signal to the address logic that prevents the pointers from being incremented; generating a second read enable signal for accessing data from a second portion of the register; applying the second read enable signal to the address logic, without applying a peek signal to the address logic, to generate second address read signals that download the data from the second portion of the register, and to increment the pointers so that additional data can be read from the register upon application of additional read enable signals.

One embodiment of the present invention may further comprise a device for reading data from two separate portions of a register without losing data comprising: a first read enable signal that is generated to access data from a first portion of the register; a second read enable signal that is generated to access data from a second portion of the register; address logic that generates a first address read signal in response to the first read enable signal that reads data from the first portion of the register, and that generates a second address read signal in response to the second read enable signal that reads data from the second portion of the register, and that generates an indexing signal upon receipt of the first read enable signal and the second enable signal that increments pointers in the address logic; a peek signal that is applied to the address logic that prevents the indexing signal from incrementing the pointers in the address logic.

One embodiment of the present invention may further comprise a method of monitoring registers in a computer system comprising: generating a read enable signal for accessing data from the registers in the computer system; applying the read enable signals to address logic to generate address read signals that download the data from the registers; applying a peek signal to the address logic that prevents pointers in the address logic from incrementing; reading the data from the registers without affecting the data in the registers.

DETAILED DESCRIPTION OF THE EMBODIMENTS

Figure 1:
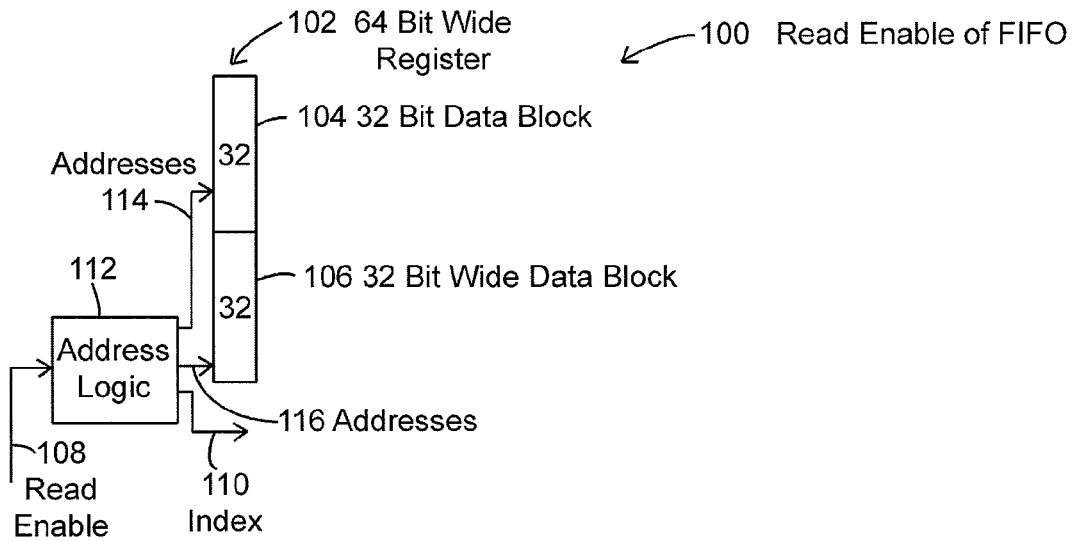
FIG. 1 is a schematic illustration of the manner in which data can be read from a FIFO register having two stages.

FIG. 1 illustrates the manner in which data can be read from a FIFO register. As shown in FIG. 1, a 64-bit wide register 102 contains two 32 bit data blocks, such as 32 bit wide data block 104 and 32 bit wide data block 106. Many computer operating systems operate by downloading 32 bit wide data blocks from registers that are 64 bits wide. Hence, only 32 bit wide data blocks are read from the 64 bit wide registers. This can cause a problem, since the 32 bit wide data block in the second part of the 64 bit wide register can be lost as a result of the automatic generation of an index signal that indexes the addresses in address logic, so that the data is no longer available in the 64 bit wide register after application of a first read enable signal. As shown in FIG. 1, a read enable signal 108 is applied to address logic 112, which generates addresses, such as addresses 114, that access a 32 bit data block 104, and addresses 116 that access the 32 bit wide data block 106, that are both stored in the 64 bit wide register 102. However, an index signal 110 is generated by the address logic 112, in accordance with many computer operating systems, after each read enable signal 108. If only one of the 32 bit data blocks, such as 32 bit data block 104, has been accessed via addresses 114, upon application of a read enable signal 108, the generation of an index signal 110 will cause the 64 bit wide register 102 to be incremented, so that neither of the data blocks 104, 106 are available in the register 102 after the index signal 110 is generated. Hence, the data contained in 32 bit wide data block 106 is lost. Once the data is read from the FIFO 102, it no longer exists in the FIFO 102. The 32 bit wide block 106 can be stored in a separate register for access in a subsequent time period, so that the data is not lost. However, storage of data in this manner is difficult and complex in certain implementations, such as illustrated in FIG. 2.

Figure 2:
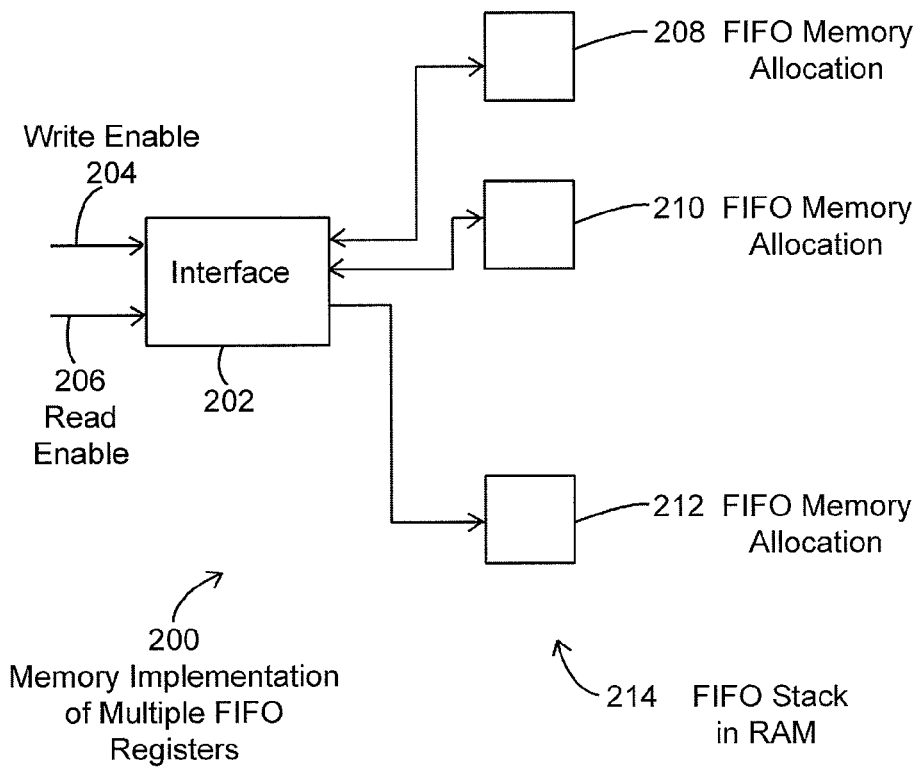
FIG. 2 is a schematic block diagram of memory implementation of multiple FIFO registers.

FIG. 2 is a schematic block diagram that illustrates an implementation of multiple FIFOs in a memory device, such as a RAM. As shown in FIG. 2, a plurality of FIFOs 208, 210, 212 form a FIFO stack 214. The FIFOs 208, 210, 212 comprise allocations of memory in a RAM, rather than individual hardwired FIFO devices. An interface 202 receives write enable signals 204 and read enable signals 206 to read and write data to the various FIFO memory allocations 208, 210, 212 in the RAM. There would necessarily be a high degree of complexity required to provide additional storage registers, in the memory implementation 200 illustrated in FIG. 2, to prevent the loss of data in the example disclosed in FIG. 1.

Figure 3:
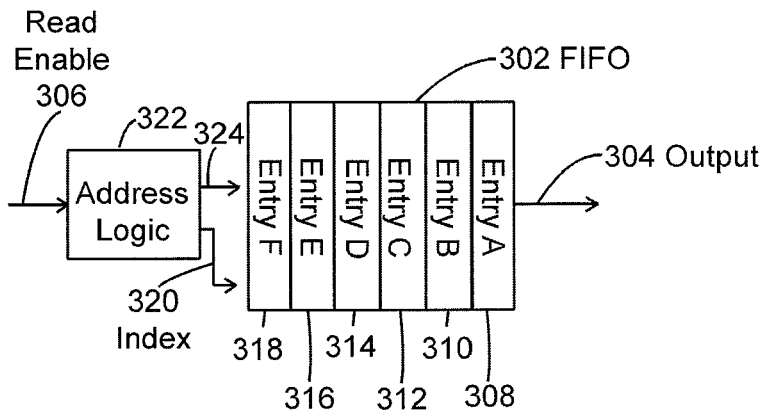
FIG. 3 is a schematic illustration of a FIFO register prior to application of a read enable signal.

FIG. 3 is a schematic illustration of a FIFO 302 that is implemented in RAM. As shown in FIG. 3, FIFO 302 stores a series of entries, i.e., entry A 308, entry B 310, entry C 312, entry D 314, entry E 316, and entry F 318. Hence, the FIFO 302, as illustrated in FIG. 3, is a six stage FIFO. Output 304 reads data from the FIFO 302 in the order in which the data was stored in the FIFO 302. For example, entry A 308 was the first block of data that was stored in the FIFO 302 and is the first data that will be read from the FIFO 302 through output 304, in response to a read enable signal 306 that is applied to address logic 322. Once entry A 308 is read from the FIFO 302, entry A 308 is no longer stored in the FIFO 302. At that point, upon application of a read enable signal 306, entry B 310 is read from the FIFO 302 via output 304. This process continues for each read enable signal 306 so that pointers are sequentially incremented in the address logic 322 as the result of the generation of index signal 320. In this manner, data is sequentially read from the FIFO 302 in the order in which the data was stored in the FIFO 302.

Figure 4:
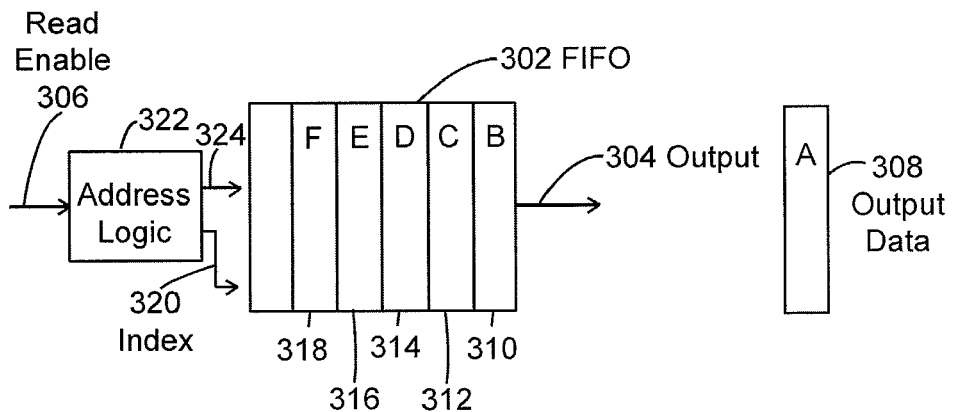
FIG. 4 is a schematic illustration of a FIFO register after application of a read enable signal.

FIG. 4 is an illustration of the FIFO 302 after a read enable signal 306 is applied to the FIFO 302. As shown in FIG. 4, data block 308 is read from the FIFO 302 and no longer exists in the FIFO 302. Data block B 310 in FIFO 302 is then ready to be read from FIFO 302, upon application of another read enable signal 306, which is applied to address logic 322 that generates read addresses 324 and index signal 320.

Figure 5:
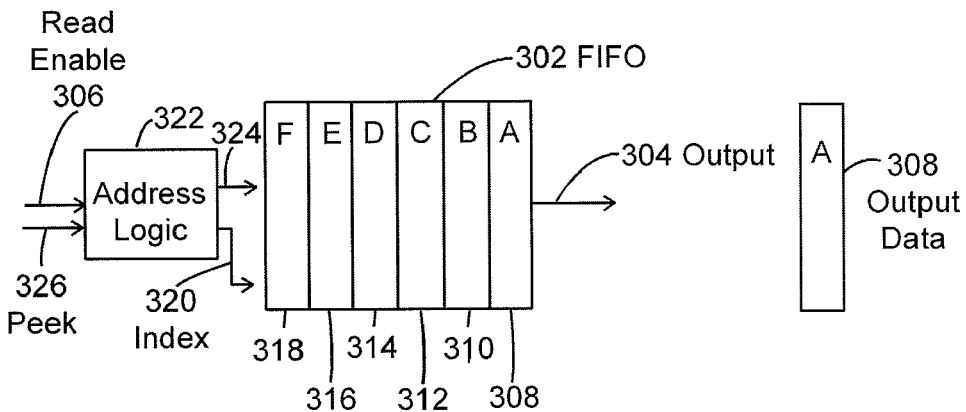
FIG. 5 is a schematic illustration of a FIFO after application of a read enable signal and a peek signal.

FIG. 5 illustrates an implementation of the use of a peek signal 326 for reading data from FIFO 302. As shown in FIG. 5, FIFO 302 stores each of the data blocks 308-318. A read enable signal 306 is applied to address logic 322, which generates address signals 324, to read data from FIFO 302. In addition, an index signal 320 is also generated and also is applied to the address logic 322. In response to the read enable signal 306 and the peek signal 320, data block entry A 308 is generated on output 304. However, when peek signal 320 is asserted, address pointers are not incremented in address logic 322 in response to the index signal. Hence, application of peek signal 326 causes the address pointers to not change so that the pointers point to the same data in FIFO 302 after application of read enable signal 306. This process is schematically illustrated in FIG. 5. As shown in FIG. 5, the FIFO 302 generates an output data block 308 on output 304. However, data block 308 is also still available in FIFO 302 for access by subsequent read enable signals 306. In this manner, access to a single 16-bit data block in a 32-bit register FIFO, as illustrated in FIG. 1, will not cause the data to be lost since all of the data in FIFO 302 is available for access by a subsequent read enable signal. In other words, the other 16-bit data block can be accessed upon application of another read enable signal because the data stored in the 32-bit register can be accessed again.

Implementation of a peek signal is simple and straightforward. Again, the peek signal simply instructs the address logic to not increment the pointers. In this manner, separate registers are not required to prevent the loss of data. Simple application of the peek signal prevents the pointers in the address logic from being incremented. Hence, implementation is a simple and inexpensive modification of the address logic that controls the reading of data from the FIFO 302.

This technique can also be used for various other purposes. For example, monitoring software that monitors the status of registers in a computer system can utilize this technique. For example, monitoring software may take a "snapshot" of the status of all of the registers in a computer system and read the data from those registers. By applying a peek control signal to the FIFOs, the status of the FIFO registers can be read without downloading and erasing the data from the FIFO. This process can be used to sequentially view the status of the registers during the operation by taking a series of snapshots of the status of these registers at various points in time. This is an extremely valuable tool, since the monitoring software will not alter the state of the registers when performing the monitoring operation.

Figure 6:
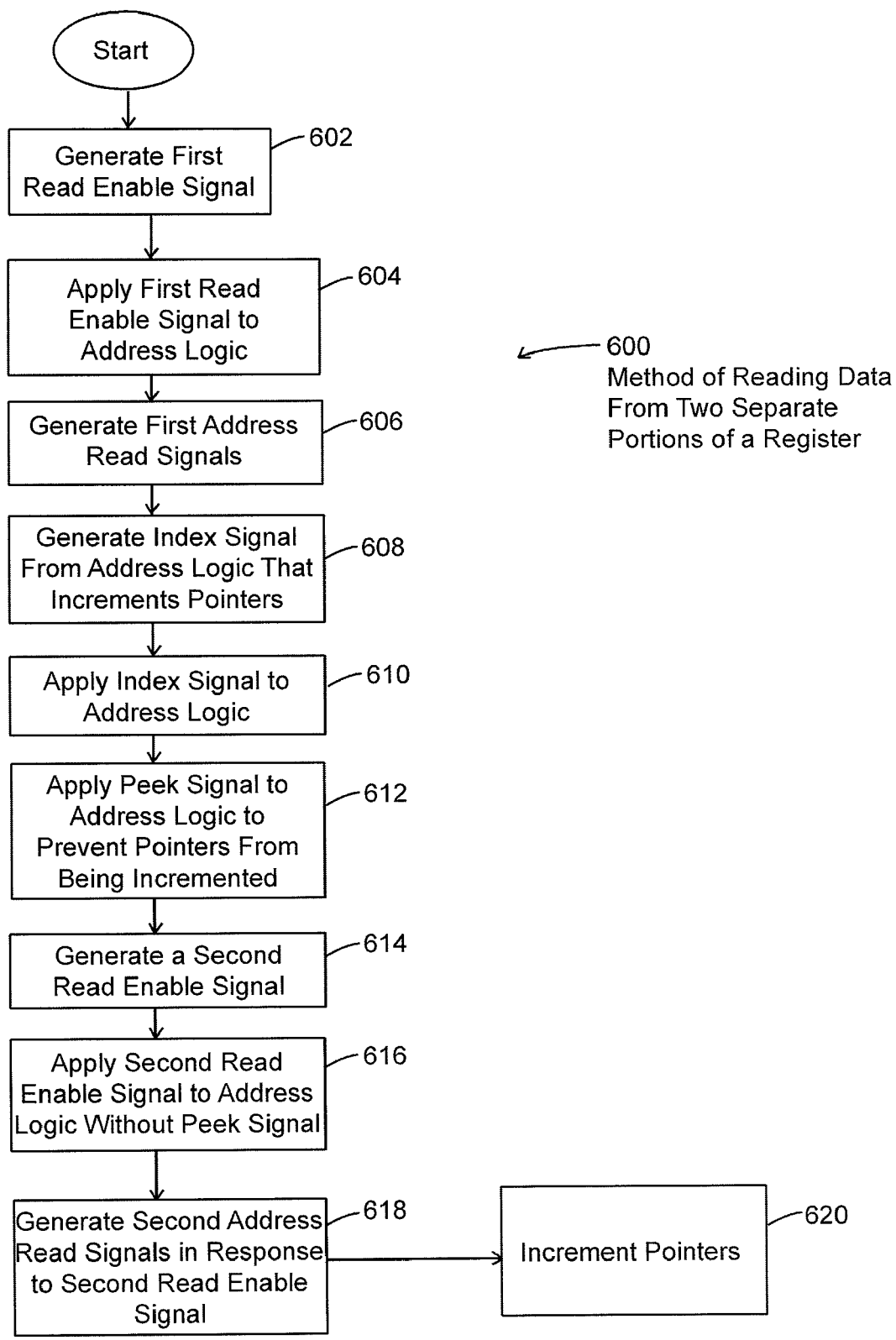
FIG. 6 is a flow diagram of a method for reading data from two separate portions of a register.

FIG. 6 is a flow diagram of one embodiment of a method for reading data from two separate portions of a register. As illustrated in FIG. 6, a first read enable signal is generated at step 602 to retrieve data from a first portion of a register. For example, the operating system of the computer may wish to access a first 32-bit data block that is stored in a 64-bit register, such as data block 104, illustrated in FIG. 1. At step 604, the first read enable signal is then applied to the address logic 322. The address logic generates first address read signals that address the locations where the data is stored in the FIFO register that is implemented in RAM, as illustrated at step 606. At step 608, an index signal is generated by the address logic that can be used to increment the pointers that point to the location where the data is stored in RAM. At step 610, the index signal is applied to the address logic. At step 612, a peek signal is applied to the address logic, which prevents the pointers from being incremented in response to the index signal. At step 614, a second read enable signal is generated for accessing a second portion of the register, such as 32-bit wide data block 106, illustrated in FIG. 1. The second read enable signal is applied to the address logic 322 without the application of peek signal 326. At step 618, second address read signals 116 are generated in response to the second read enable signal to read the data block 106 in the second portion of the register 102. At step 620, the pointers are incremented in the address logic 322, so that the data in the next register is accessed by the system. In this manner, all of the data is read from the two separate portions of the register, since the peek signal 326 blocks the incrementing of pointers in the address logic 322.

Figure 7:
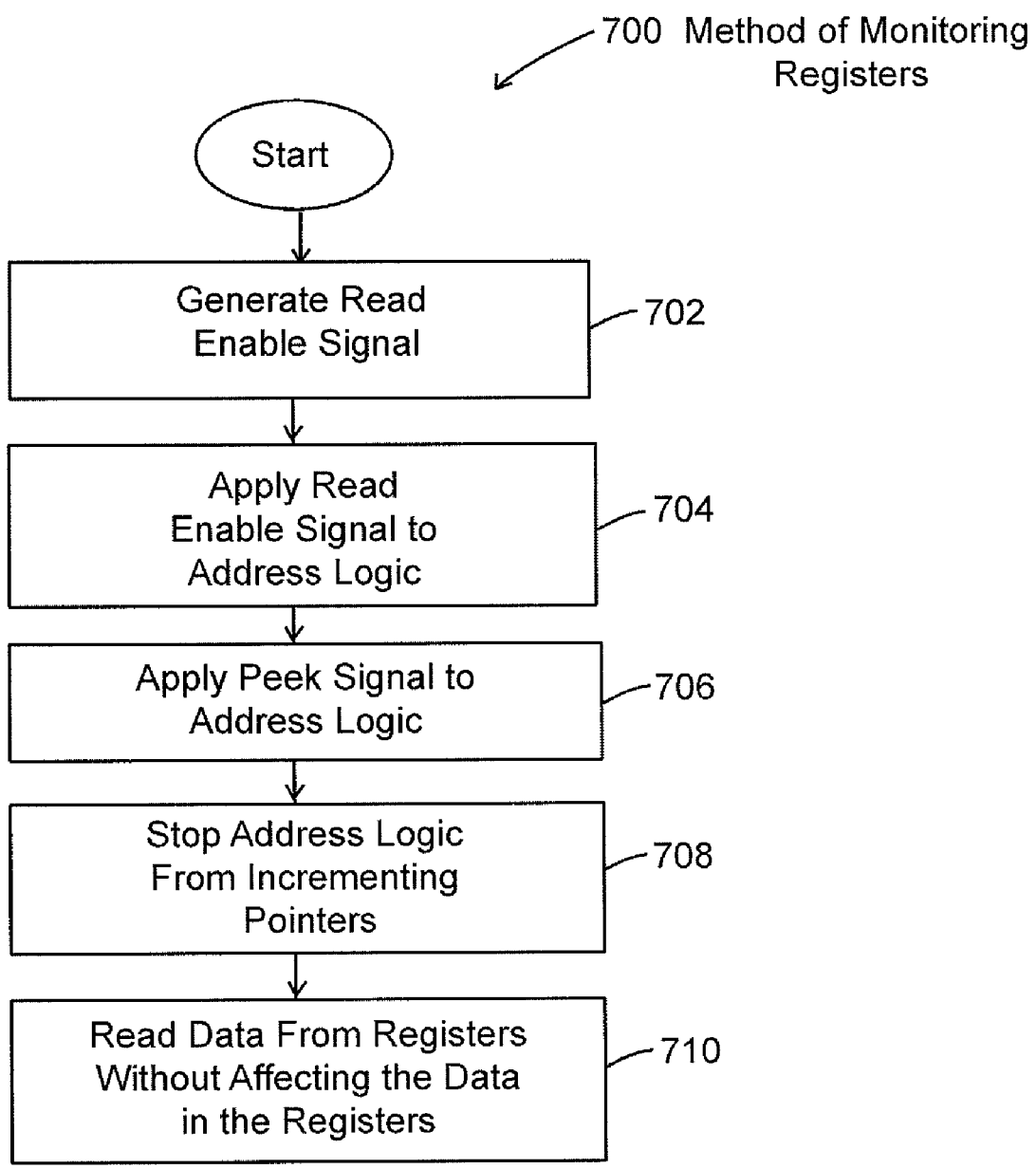
FIG. 7 is a flow diagram of a method for monitoring registers.

FIG. 7 is a flow diagram of one embodiment of a method for monitoring registers in a computer system. For example, monitoring software for monitoring the operation of a computer system may utilize the processes shown in FIG. 7. At step 702, a read enable signal is generated for the purpose of reading data from registers to be monitored by the monitoring software. At step 704, the read enable signal is applied to the address logic that generates read address signals for reading data from the registers. At step 706, a peek signal is applied to the address logic, so that the data can be read from the registers without affecting the status of the registers. At step 708, the peek signal stops the address logic from incrementing the pointers, so that the address pointers point at the same data after the read enable signal has been asserted in the address logic 322. At step 710, data is read from the registers without affecting the data in the registers. Hence, the pointers remain at the same location, so that the data can be read and utilized by the computer system, and the monitoring software does not affect the operation or change the status of the registers, while still being able to access the data in the registers.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of reading data from two separate portions of a register without losing data comprising:
   generating a first read enable signal for accessing data from a first portion of said register;
   applying said first read enable signal to address logic to generate first address read signals that download said data from said first portion of said register;
   generating an index signal from said address read signals;

applying said index signal to said address logic;

applying a peek signal to said address logic that prevents said pointers from being incremented;

generating a second read enable signal for accessing data from a second portion of said register;

applying said second read enable signal to said address logic, without applying said peek signal to said address logic, to generate second address read signals that download said data from said second portion of said register, and to increment said pointers so that additional data can be read from said register upon application of additional read enable signals.

2. The method of claim 1 wherein said process of reading data from two separate portions of a register comprises reading data from two separate portions of a register that is designated in RAM.

3. A device for reading data from two separate portions of a register without losing data comprising:

a first read enable signal that is generated to access data from a first portion of said register;

a second read enable signal that is generated to access data from a second portion of said register;

address logic that generates a first address read signal in response to said first read enable signal that reads data from said first portion of said register, and that generates a second address read signal in response to said second read enable signal that reads data from said second portion of said register, and that generates an indexing signal upon receipt of said first read enable signal and said second enable signal that increments pointers in said address logic;

a peek signal that is applied to said address logic that prevents said indexing signal from incrementing said pointers in said address logic.

4. The device of claim 3 wherein said registers are FIFO registers designated in RAM.

5. A method of monitoring registers in a computer system comprising:

generating a read enable signal for accessing data from said registers in said computer system;

applying said read enable signals to address logic to generate address read signals that download said data from said registers;

applying a peek signal to said address logic that prevents pointers in said address logic from incrementing;

reading said data from said registers without affecting said data in said registers.

6. The method of claim 5 wherein said process of monitoring registers comprises monitoring FIFO registers designated in RAM.

* * * * *